United States Patent [19]
Wood

[11] 3,731,865
[45] May 8, 1973

[54] FLUID TRANSFER MEANS

[75] Inventor: Michael Burke Wood, Fossway, England

[73] Assignee: International Research & Development Company Limited, Fossway, Newcastle upon Tyne, England

[22] Filed: Mar. 1, 1971

[21] Appl. No.: 119,789

[30] Foreign Application Priority Data

Feb. 27, 1970 Great Britain.......................9,717/70

[52] U.S. Cl. ......................277/15, 137/580, 277/22, 277/74, 277/DIG. 8, 310/52, 310/54
[51] Int. Cl. ................................................H02k 9/00
[58] Field of Search......................277/15, 22, 74, 75, 277/DIG. 8; 137/580; 310/40, 52, 54

[56] References Cited

UNITED STATES PATENTS

| | | | |
|---|---|---|---|
| 3,626,717 | 12/1971 | Lorch | 62/505 |
| 2,230,881 | 2/1941 | Browne | 277/DIG. 8 |
| 3,517,231 | 6/1970 | Massar | 310/52 |
| 3,587,638 | 6/1971 | Lambrecht | 277/15 |

Primary Examiner—William F. O'Dea
Assistant Examiner—Peter D. Ferguson
Attorney—Kemon, Palmer & Estabrook

[57] ABSTRACT

A rotary seal assembly for transfer of cryogenic fluid to a rotor in which the fluid passes from a port in a stationary vacuum-insulated wall to a port in a rotating vacuum-insulated wall by way of an annular space between the walls which is closed by rotary seals at its ends remote from the ports and is shaped to minimize flow from the ports to the seals so that the seals can operate at ambient temperature.

5 Claims, 2 Drawing Figures

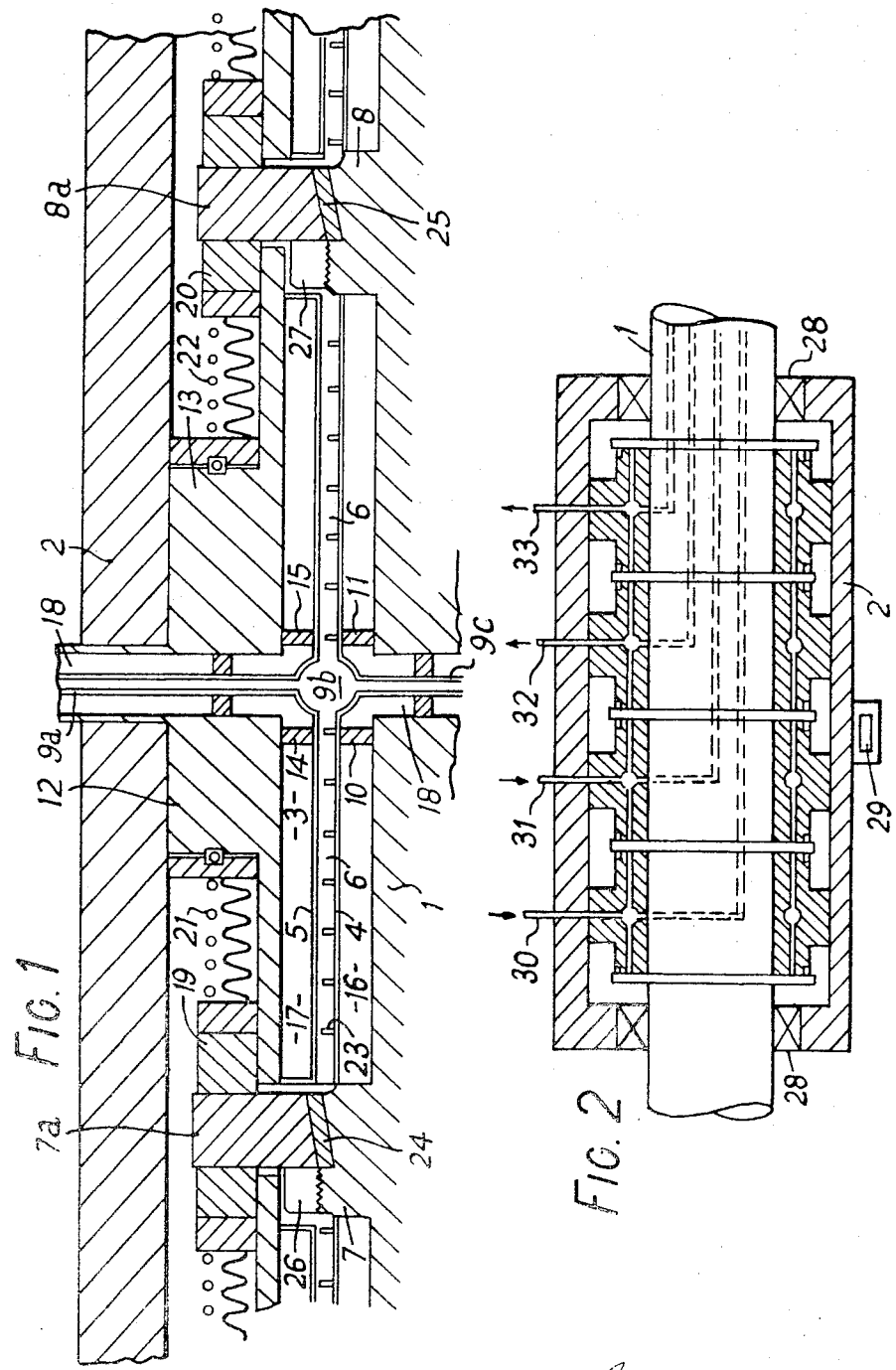

FLUID TRANSFER MEANS

This invention relates to a rotary seal assembly for the transfer of fluid between a stationary and a rotating body. It is particularly though not exclusively concerned with the use of such fluid transfer means in machines where large temperature differences exist between the fluid and the stationary and/or rotating parts of the machine.

Typical of such machines is a superconducting electrical machine where an electrical winding of the machine is formed of superconducting material, such as niobium-titanium alloy, maintained at a temperature in the range 4°–20°K using a cryogenic fluid such as liquid or gaseous helium.

In a typical direct current machine of this type, the superconducting winding is the stator winding which is enclosed in a cryostat and the rotor can operate at normal temperature. For alternating current machines, there are difficulties in providing superconducting materials capable of carrying alternating currents without substantial losses.

One way of avoiding these difficulties in an alternating current machine is to use superconducting material in the direct current field winding which, in large output machines such as synchronous generators, is usually mounted on the rotor. A form of alternating current machine using a rotor field winding of superconducting material is described in co-pending application Ser. No. 43,693, now U.S. Pat. No. 3,648,082 filed June 5, 1970, by McNab et al. and assigned to the assignee of the present application.

With a rotating superconducting field winding there is the problem of cooling the winding in a rotating body. The cryogenic fluid can be generated by refrigerating plant rotating within the rotor or it may be produced in stationary refrigerating equipment outside the rotor and conveyed to the rotor by suitable connections.

The transfer of cryogenic fluid from a stationary to a rotating body can present problems in that some form of rotating seal must be used and there is considerable difficulty in obtaining seal material suitable for use at cryogenic temperatures.

In accordance with the present invention there is provided a rotary seal assembly for the transfer of fluid between a stationary and a rotary body comprising a vacuum-insulated duct in the stationary body terminating at a port in a vacuum-insulated wall fixed to the stationary body, and a vacuum-insulated duct in the rotary body terminating at a port in a vacuum-insulated wall fixed to the rotary body, the two walls facing one another and bounding a space which is closed by a rotary seal or seals between the stationary and rotating bodies at a position remote from the ports, the said space being of such dimensions as to minimize flow through the space from the ports to the seal or seals and thereby sustain a substantial temperature difference between the seals and the fluid flowing between the ports.

In the application to a machine having a rotating shaft to which cryogenic fluid is to be supplied, a vacuum insulated duct for cryogenic fluid passes through a fixed housing surrounding the shaft and the sealed space is an annular space formed in the housing between two annular walls, an inner wall attached to but separated by a vacuum space from the shaft and rotating therewith and a stationary outer wall attached to but separated by a vacuum space from the housing.

In one embodiment the fixed housing is mounted on bearings on the shaft and locked against rotation.

The inner wall may carry a series of axially spaced circumferential flanges or control fences extending radially close to the outer wall to increase resistance to fluid flow in the sealed space in the direction of the axis of rotation.

The sealed space may be sealed at its ends axially remote from the fluid ducts by thrust ring seals bearing against fixed collars on the shaft.

The invention will be described in more detail with the aid of an example illustrated in the accompanying diagrammatic drawings, in which:

FIG. 1 shows in section a rotary seal assembly in accordance with the invention as applied to the transfer of cryogenic fluid between a fixed housing and the rotary shaft of an alternating current generator having a superconducting rotor winding, an FIG. 2 shows diagrammatically in section a number of seal assemblies as shown in FIG. 1 providing inlets and outlets for the passage of cryogenic fluid to the rotor.

In the arrangement shown in the drawings a rotor shaft 1 is surrounded by a fixed housing 2. In a space 3 formed between the housing 2 and the shaft 1 are arranged two walls, an inner wall 4 and an outer wall 5 which define between them an annular space 6. The inner wall 4 which may, for example, be of stainless steel is welded to collars 7 and 8 on the shaft 1 at the axially outer ends of the wall and to a vacuum insulated cryogenic fluid inlet duct 9c. Annular support rings 10 and 11 support the wall 4 adjacent the duct 9c.

The outer wall 5 is joined at its axially outer ends, for example by welding, to fixed members 12 and 13 which are fixed to the housing. The wall 5 is also joined to an inlet duct 9a. Annular support rings 14 and 15 support the wall 5 adjacent the duct 9a.

Space 16 between the wall 4 and the rotor shaft 1 and space 17 between the wall 5 and the fixed members 12 and 13 are both vacuum spaces. Vacuum spaces 18 surround the inlet ducts 9a and 9c.

Cryogenic fluid entering through the duct 9a passes from a port in the wall 5 into an annular passage 9b encircling the rotary shaft 1 and from here passes by way of a port in the inner wall 5 into the duct 9c in the rotating shaft. The annular passage 9b forms part of the space 6 between the walls 4 and 5 and cryogenic fluid thus enters the space 6. The axially-outer ends of the space 6, remote from the ducts 9a and 9c, are closed by rotary seals 19 and 20 which are in the form of thrust rings pressed by springs 21 and 22 into contact with collar extensions 7a and 8a respectively. The seals 19 and 20 operate essentially at ambient temperature and consequently can be made of conventional sealing material such as carbon.

In order to reduce heat transfer into the cryogenic fluid, it is necessary to minimize convection and conduction of heat in space 6. Conduction can be minimized by keeping the thickness of walls 4 and 5 to a minimum. Convention is minimized by keeping circulation of fluid in the space 6 to a minimum. This can be achieved by axially spaced circumferential flanges or vortex control fences 23 fitted to the surface of the wall 4. These extend radially close to the surface of wall 5 and form in effect separate pockets of fluid along the axial length of the space 6. By mounting the housing 2 on bearings on the shaft 1 as shown in FIG. 2 the radial clearances between the flanges 23 and wall 5 can be accurately maintained.

To facilitate assembly and access to the seals, the collars 7a and 8a can be made removable, as shown, the collars having tapered bores which fit over conical bushes 24 and 25 respectively. The bushes may be of a material such as polytetrafluoroethylene. The collars are locked in position by locking nuts 26 and 27.

In some instances it may be desirable to have a plurality of inlet and outlet ducts for cryogenic fluid in which case the sealing arrangement of FIG. 1 can be repeated along the rotor shaft as shown diagrammatically in FIG. 2. In FIG. 2 the bearings on which the housing is mounted on the shaft 1 are shown at 28. Rotation of the housing is prevented by locking pin arrangement 29.

In the arrangement shown there are two inlets 30 and 31 and two outlets 32 and 33 which communicate through ducts in the rotor shaft with cooling passages in the rotor.

The cryogenic fluid entering the rotor shaft could be used to provide intermediate refrigeration and then returned to the refrigerator outside the rotor for recooling before being used to refrigerate the superconducting winding.

While in the arrangement described the cryogenic fluid passes through ducts extending radially of the rotating body it is possible for the ducts to enter the rotating body axially from one end, in which case the space between the vacuum insulated walls is a cylindrical space coaxial with the ducts and extending from the ports through which fluid transfer is effected to a single rotary seal axially spaced from the said ports.

Whilst the invention has been described with particular reference to an electrical machine it could be used to transfer cryogenic fluid in any equipment or apparatus where such fluid has to be transferred from a stationary to a rotating body or vice versa. Further whilst the invention has been described with particular reference to the use of cryogenic fluid it could also be used with hot fluids and where there is a need to minimize heat transfer from the hot fluid to the stationary and rotating bodies.

What is claimed is:

1. A rotary seal assembly for the transfer of fluid between a stationary body and a rotating body comprising a first vacuum-insulated wall fixed to the stationary body, a port in said first wall, a first vacuum-insulated duct in the stationary body terminating at said port, a second vacuum-insulated wall fixed to the rotating body, a second port in said second wall, a second vacuum-insulated duct disposed in the rotating body and terminating at said second port, said first and second vacuum-insulated walls being disposed in face-to-face relationship and separated by a space with which each of said ports communicates, and rotary seal means between said stationary and rotating bodies closing said space between the vacuum-insulated walls, said space being dimensioned to minimize flow from said ports to said rotary seal means and thereby sustain a substantial temperature difference between said seal means and the fluid flowing between the ports.

2. A rotary seal assembly as claimed in claim 1 comprising control fences mounted on one of said walls and extending towards the other wall, the control fences being disposed transverse to the direction of flow between said ports and said rotary seal means to restrict such flow.

3. A rotary seal assembly as claimed in claim 1 in which the stationary body is a housing surrounding and coaxial with the rotating body, said walls are annular and said space is an annular space.

4. A rotary seal assembly as claimed in claim 3 in which the wall on the rotating body carries a plurality of axially-spaced radially-extending flanges whose free edges lie adjacent said first wall to reduce fluid flow between said walls towards said rotary seal means.

5. A rotary seal assembly as claimed in claim 3 in which said rotary seal means comprises collars on said rotating body and thrust seals mounted on said housing and bearing against said collars.

* * * * *